United States Patent [19]

Veale

[11] Patent Number: 4,546,299
[45] Date of Patent: Oct. 8, 1985

[54] LOW COST SERVO OPERATED DIGITAL POSITIONING SYSTEM

[75] Inventor: John R. Veale, Manhattan Beach, Calif.

[73] Assignee: Manhattan Engineering Co., Inc., Torrance, Calif.

[21] Appl. No.: 563,405

[22] Filed: Dec. 20, 1983

[51] Int. Cl.$^4$ .............................................. G05B 1/01
[52] U.S. Cl. .................... 318/608; 318/602; 318/640
[58] Field of Search .............. 318/604, 602, 608, 640, 318/600

[56] References Cited

U.S. PATENT DOCUMENTS

| | | | |
|---|---|---|---|
| 3,875,468 | 4/1975 | Yagi et al. | 318/604 X |
| 4,215,301 | 7/1980 | Mason | 318/640 X |
| 4,227,133 | 10/1980 | Imamura | 318/640 X |
| 4,342,077 | 7/1982 | Passey et al. | 318/608 X |
| 4,476,420 | 10/1984 | Asakawa | 318/608 |

Primary Examiner—B. Dobeck
Attorney, Agent, or Firm—Robert J. Schaap

[57] ABSTRACT

A low cost servo operated digital positioning system which utilizes a phase shift control circuit in combination with an encoder and servo circuit for driving a moveable element. The encoder generates a pair of signals A which may be equivalent to a sine signal A and a cosine signal A. The phase shift circuit multiplies signals from the encoder by a sine of a demand signal B and by a cosine of the demand signal B and produces a sine (A+B) signal and a cosine (A+B) signal. These sine and cosine shift signals are introduced into a servo circuit for control of a moveable element. By phase shifting these signals it is possible to substantially increase the overall number of positions to which a moveable member may be moved and thereby substantially increase the overall accuracy of a positioning system.

19 Claims, 5 Drawing Figures

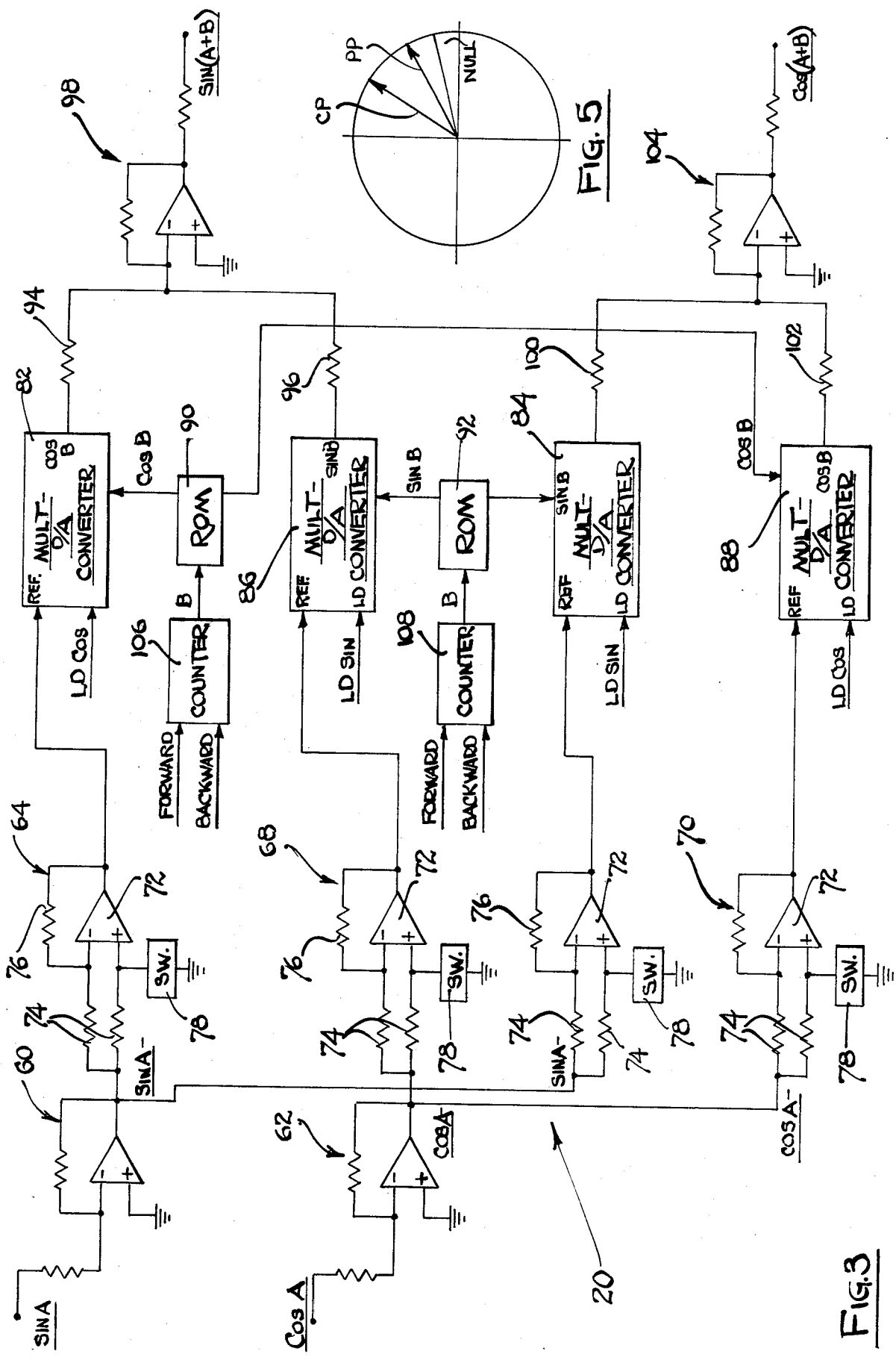

LOW COST SERVO OPERATED DIGITAL POSITIONING SYSTEM

BACKGROUND OF THE INVENTION

1. Field of the Invention

This invention relates in general to servo operated control systems and more particularly, servo operated digital positioning control systems which are capable of being manufactured on a low cost basis and which utilize a phase shifting of a drive signal to obtain accurate servo positioning.

2. Brief Description of the Prior Art

High accuracy positioning systems have been used for many years in a variety of military and aerospace applications to position moveable control members. Such applications include the positioning of antennas and optical sensors. A key element in any positioning system is the position transducer used to sense the position of the moveable control element since the overall performance of the positioning system is a function of the accuracy, repeatability and linearity of the position transducer. Historically, many types of transducers have been employed to measure position, such as potentiometers, resolvers, differential transformers, magnetic encoders, optical encoders and the like.

Optical shaft encoders have found widespread use as position transducers in high accuracy positioning systems. In particular, absolute position optical encoders are employed to obtain the high resolution necessary for accurate positioning. These types of encoders include a light source, such as a light emitting diode, a group of photo-sensors, such as photo-diodes, and a coded disc positioned between the light source and the photo-sensors. If the control element to be positioned is the shaft of a motor, the coded disc is rotatably mounted to the motor shaft. The coded disc includes patterns of clear and opaque segments which vary in size and location according to the resolution required by the application. The patterns are arranged so that light passes from the light source through the clear segments of the disc and illuminates the photo-sensors in a prescribed manner whereby the photo-sensor output signals form a binary representation of the absolute position of the motor shaft.

The coded disc is usually formed of glass and the patterns are photographically imprinted on the disc to create the clear and opaque areas. As the disc rotates with the motor shaft, the photo-sensors detect the absence or presence of light as a function of both the disc patterns and the position of the disc. The disc patterns are configured so that the photo-sensor output signals may be combined to form a digital number using a code, such as binary coded decimal or gray binary code. The resolution of the encoder determines the number of bits required in the digital number.

The size of the disc, the required accuracy of the pattern, and the required number of photo-sensors all increase as the resolution requirement of the encoder increases. For example, to resolve one revolution of the motor shaft into a thousand parts requires a coded disc of approximately two and one-half inches in diameter and ten photo-sensors. Higher resolutions require larger discs, extremely accurate patterns, and a proportionately greater number of photo-sensors. The mechanical alignment of the disc, light source and photo-sensors also becomes a critical factor in higher resolution encoders. Because of the critical alignment requirements, as well as the large number of components employed in their construction, absolute position optical encoders are expensive to produce. Accordingly, the use of these encoders has been limited primarily to military and aerospace applications, as opposed to commercial and industrial applications.

Another type of optical encoder which has found widespread use in positioning systems is the incremental position encoder. Incremental position encoders are less expensive to produce than absolute position encoders, but suffer from limited resolution. This type of encoder also employs a light source and a group of photo-sensors. Mounted in a parallel, spaced-apart relationship between the light source and the photo-sensors is a moveable control element such as a motor shaft. The disc and the reticle are each provided with a pattern of clear apertures and opaque areas. As the moveable disc rotates with the motor shaft, light paths from the light source to the photo-sensors are created by the juxtaposition of the apertures in the disc and reticle. The light paths are detected by the photo-sensors which are positioned with respect to the reticle to create two output signals in response to the rotation of the moving disc. These two signals are typically in the form of sine or square waves displaced in phase ninety degrees with respect to each other. Each of the sine or square waves represents the incremental rotation of the moveable disc by a distance equal to the spacings between apertures.

Counting the number of sine or square waves that occur as the motor shaft rotates provides a determination of the position of the shaft. Prior art techniques have also been developed for counting the number of zero crossings which occur in the encoder output signals. These techniques permit resolving the position of the motor shaft into four parts for each of the apertures in the disc pattern. The resolution thus obtainable in the use of incremental shaft encoders has been limited to four times the number of apertures which can be formed by the pattern on the discs. Incremental encoders are typically limited to disc patterns having a maximum of one thousand apertures per inch. Increasing the number of apertures beyond this number is impractical because of the extremely accurate tolerances required in the manufacture and assembly of such encoders. Resolving each of the apertures into four parts as described above results in a resolution of one part in ten thousand using incremental position encoders. On the other hand, high accuracy positioning systems may require resolutions of one part in one million. Therefore, incremental encoders have been limited to use in positioning systems which do not require high positioning accuracy.

In my co-pending patent application Ser. No. 275,926, filed June 22, 1981, entitled "Digital Positioning Systems Having Accuracy", there is provided a digital servo control system which utilizes incremental position optical encoders as position transducers for obtaining high position accuracy. This system generates a highly accurate digital position signal in response to output signals from an incremental optical encoder. While this system is highly effective in achieving accurate positioning, it is possible to utilize a lower cost digital positioning servo system for any applications, as for example, in printer control drive systems and the like. Further, it is possible to modify an existing servo control system in order to substantially improve the accuracy thereof.

OBJECTS OF THE INVENTION

It is a primary object of the present invention to provide a new and improved digital positioning control system in which an encoder signal can be phase shifted in order to provide a substantially higher degree of position resolution.

It is another object of the present invention to provide a control system of the type stated which utilizes a phase shift circuit for shifting sine and co-sine representative signals as outputs of a drive motor in order to increase the position resolution of the control system.

It is an additional object of the present invention to utilize an incremental encoder in an existing servo control system by introducing into that system a phase shift control in order to substantially increase position resolution of the system and thereby substantially increase the accuracy of that system.

It is also an object of the present invention to provide a phase shift circuit for a control system of the type stated which utilizes multiplying digital-analog converters for generating an analog position signal and memories which are stored with sine and co-sine values for giving demand signals.

It is still another object of the present invention to provide a method for accurately positioning a moveable member by phase shifting an encoded signal to increase positioning accuracy.

With the above and other objects in view, my invention resides in the novel features of form, construction, arrangement and combination of parts presently described and pointed out in the claims. Thus, these and other objects and features and advantages of the invention will become apparent from the reading of the specification when taken in conjunction with the drawings in which reference numerals refer to like elements in the figures.

BRIEF SUMMARY OF THE DISCLOSURE

The foregoing and other objects of the invention are accomplished by a digital positioning control system which employs an incremental position optical encoder which is used as a position transducer. A moveable member or so-called "load" is moved by a drive motor which is, in turn, controlled by a servo circuit. The drive motor utilizes an optical encoder which is capable of generating a position signal from the position of the drive shaft of the motor. The optical encoder signal is normally introduced into a servo circuit which, in turn, drives the motor in order to properly position the moveable member or so-called "load".

In the type of servo control system previously mentioned, and which is effectively used in the prior art, the position signal generated by the encoder usually includes an in-phase signal and a quadrature signal. The in-phase signal is in the form of a sine wave where one full cycle generally corresponds to the rotation of a moveable encoder disc over an incremental distance of one fringe. The quadrature signal is generally in the form of a cosine wave which is displaced in phase by 90 degrees relative to the in-phase signal. One full cycle of the cosine wave also corresponds to the moveable disc rotating an incremental distance of one fringe. The moveable member which is normally moved by the servo control system may be an arm of an X-Y plotter or it may adopt the form of a reading head or reading/writing head of a magnetic disc drive or other similar moveable member. The control system generally attempts to move the moveable member to a command position in response to a command signal.

The incremental encoder generally employs a light source, photo-sensors, a moveable disc and a fixed reticle. The disc and reticle are positioned in spaced apart relationship between the light source and photo-sensors. The disc is typically mounted on the output shaft of the drive motor, as aforesaid, and is controlled by the servo system.

The essence of the invention in one embodiment lies in the fact that it is possible to obtain two signals from a conventional low cost encoder with a phase shift existing between these two signals, multiplying command position signals by a trigonometric function, converting from a digital format to an analog format and thereby obtaining an error signal in order to drive a moveable member from a present or current position to a demand or command position.

More specifically in one embodiment the invention relates to a closed loop digital control system for moving a moveable member to a command position in response to a command position signal. The control system comprises an encoding means for providing a first digital position information signal and a second digital position information signal which are phase related and together represent a present position of a moveable member. A means is further provided for multiplying signals representing a command position for the moveable member by trigonometric functions of these signals representing a command position is further provided. A digital to analog converting means converts processed position information signals and multiplied command position signals to an analog format. A comparison means compares the present position signals and the command position signals in such manner as to derive a position error signal representing a difference between a present position of the moveable member and the command position therefor, and a motive means moves the moveable member to the command position.

The present invention utilizes a phase shift circuit which is interposed between the output of the encoder and the servo control circuit. The phase shift circuit utilizes the in-phase and quadrature signals, which are effectively sine and cosine signals, as aforesaid. By introducing a demand signal into the phase shift circuit, a sine of a combination of a signal from the encoder and the demand signal as well as a cosine of a combined signal from the encoder and demand signal can be introduced into the servo control circuit for phase shifting this output signal from the servo circuit. In this way, the servo circuit attempts to position the moveable member at a null position of the sine or cosine wave. By phase shifting the encoder signals by a specified angle, it is thereby possible, to substantially increase the number of possible positions achieved by the servo control circuit. Theoretically, it is possible by using this phase shift control circuit, to achieve an infinite number of positions.

The phase shift control circuit utilizes at least a pair of and preferably four multiplying digital/analog converters along with a pair of memories, one of which stores sine values and the other of which stores cosine values. Preferably, these memories are read-only memories. The memories are provided with a demand input signal and generate a signal corresponding to the sine of the demand input signal which is introduced into one of the multiplying digital/analog converters and a signal representative of the cosine of the demand input signal and which is introduced into the other of the multiplying digital/analog converters. The output of the digital/analog converters are summed to generate a pair of signals which are introduced into a servo control circuit, which may be a conventional servo circuit.

It is possible to use other trigonometric functions of the demand signal, as for example, cotangent and tangent functions. The sine and cosine trigonometric functions are desired since they are mathetically and hence electrically, the easiest to implement.

This invention possesses many other advantages and has other purposes which will be made more clearly apparent from a consideration of the forms in which it may be embodied as shown in accompanying drawings. They will now be described in detail for purposes of illustrating the general principals of the invention, but it is to be understood that such detailed descriptions are not to be taken in a limiting sense.

BRIEF DESCRIPTION OF THE DRAWINGS

Figure 1:
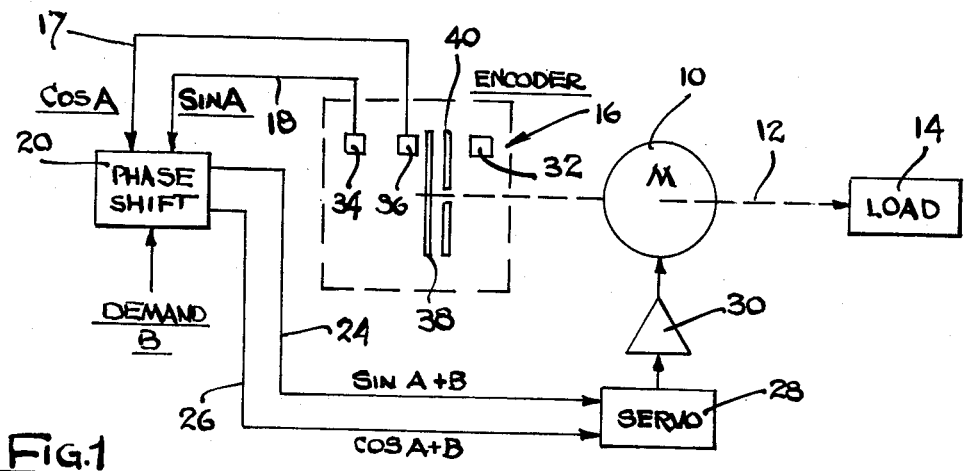
Figure 2:
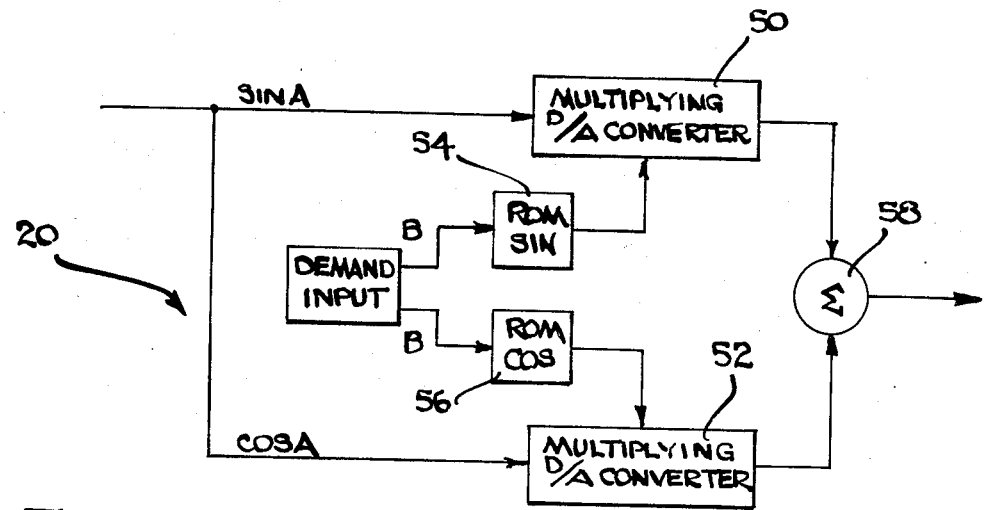
Figure 4:
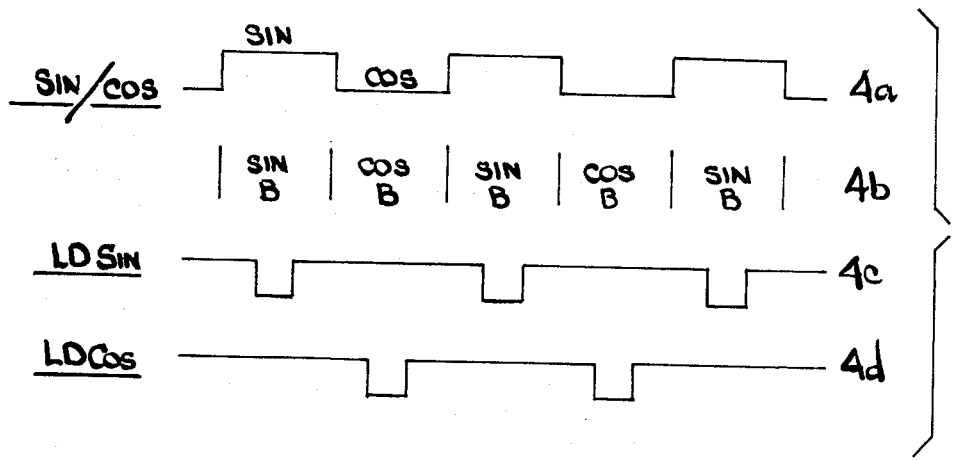

Having thus described the invention in general terms, reference will now be made to the accompanying drawings in which:

FIG. 1 is a schematic view of a servo control system utilizing a phase shift circuit forming part of the present invention;

FIG. 2 is a schematic block diagram showing one portion of the phase shift circuit;

FIG. 3 is a schematic circuit diagram showing the phase shift circuit of the invention in more detail;

FIG. 4 is a schematic representation of certain signals which are generated in accordance with the system of the present invention; and FIG. 5 is a graphical illustration of a vector diagram showing a representation of movement of a moveable member from a current or present position to a demand position.

DETAILED DESCRIPTION OF A PREFERRED EMBODIMENT

Referring now in more detail and by reference characters to the drawings, FIG. 1 illustrates a conventional drive motor 10 which has a drive shaft 12 connected to a load 14 which may be, for example, a moveable element. The drive shaft 12 of the motor or another moveable portion of the motor 10 may be connected to a conventional encoder 16, as for example, an optical shaft encoder.

The output of the encoder includes a cosine output 17 and a sine output 18 which are, respectively, designated as "COS A" and "SIN A" and which are introduced into a phase shift circuit 20 more fully described in detail hereinafter. The phase shift circuit receives a demand input signal designated as "B" on an input line 22. The phase shift control circuit 20 has a first output 24 and a second output 26 introduced into a servo circuit 28. The first output 24 is a sine of the signals A+B and is designated "SIN A+B" and the second of the signals over the line 26 is a cosine of the signal A+B and is designated "COS A+B". The output of the servo circuit is amplified in a conventional amplifier 30 and supplied to the motor 10 for repositioning the motor in accordance with the encoded signals from the encoder 16.

The optical encoder mechanism is only one form of position encoder mechanism which may be employed in the servo system of the invention for generating position signals, as hereinafter described. The optical shaft encoder mechanism 16 is operable with and includes a light source 32 which may be in the form of one or more light-emitting diodes and which are illuminated by a power supply (not shown). One or more photo transducers, such as a pair of so-called "photo-sensors" 34 and 36 are located to receive light from the light source 32.

Mounted between the light source 32 and the photo-sensors 34 and 36 is a moveable disc 38 and a fixed reticle 40. The fixed reticle 40 may be fixedly mounted to a frame which forms part of the encoder mechanism and the moveable disc is mounted on the drive shaft 12 of the motor 10. The moveable disc 38 and for that matter, the fixed reticle 40 may each be constructed of thin sheets of a transparent material, such as glass. The surfaces of both the disc 38 and the reticle 40 are provided with patterns of equally spaced apart clear and opaque segments which may be formed by photographic imprinting. The clear segments are in the form of narrow spaces angularly disposed and equally spaced around the periphery. Further, the disc 38 and the reticle 40 are positioned in parallel spaced apart relationship with typically, 10 mils of clearance between them.

The output signals of the encoder 16 may be amplified by conventional amplifiers (not shown). These output signals, which are the in-phase and quadrature signals, are also the sine and cosine signals, respectively. The sine wave signal is generated in response to each fringe created by movement of the disc 38. Similarly, the cosine signal is comprised of one cycle of the wave being generated in response to each fringe.

A variety of incremental position optical and shaft encoders of the type described above are commercially available, such as an encoder type R-1500, manufactured by Electro-Craft Corporation, Hopkins, Minn. and encoder type L-25 manufactured by EEI Electronics, Inc., of Little Rock, Ark. One technique for using these types of encoders is to determine position by counting the number of fringes generated as the disc 38 rotates. Fringe counting is generally accomplished by detecting each zero crossing occurrence of the sine and cosine waves relative to a zero base line.

The phase shift circuit 20 is schematically illustrated in a simplified form in FIG. 2 of the drawings and is generally designed to solve the trigonometric expressions:

$$SIN (A+B) = (SIN A \times COS B) + (COS A \times SIN B)$$

$$COS (A+B) = (COS A \times COS B) - (SIN A \times SIN B)$$

As indicated previously, the signal A is that output signal from the encoder and the signal B is the demand signal. By generating the sine and cosine signals, as aforesaid, it is possible to phase shift the encoded signal by a preselected amount before introduction into the servo circuit 28.

Referring now to FIG. 2, it can be observed that one of the input signals A is introduced into a first multiplying digital-analog converter 50 and a second multiplying digital-analog converter 52. The demand input signal B is introduced into a first memory means such as a read-only memory 54 and a second memory means such as a read-only memory 56. The memory 54 is programmed to contain the sine equivalents of the signal B and the read-only memory 56 is designed to contain the cosine equivalents of the input signal B. Thus, the read-only memory 54 generates a sine-B signal which is introduced into the multiplying digital/analog converter 50 and the read-only memory 56 generates a cosine signal, COS-B, which is introduced into the multiplying digital-analog convertor 52.

Outputs of the analog to digital converters 50 and 52 are then summed in a summing circuit 58, which may be a conventional resistive summing circuit, for producing a combination sine (A+B) or otherwise a combination cosine (A+B) signal. By effectively time sharing the multiplying digital-analog converters 50 and 52, and by effectively using the ROM's 54 and 56 in the time sharing arrangement, it is possible to generate a pair of outputs with one of the outputs representing sine (A+B) and the other representing cosine (A+B).

A more preferred form of an electrical circuit arrangement which may be used in the phase shift circuit 20 is illustrated in FIG. 3. In this case, the sine A signal and the cosine A signal which are derived from the optical encoder are introduced into inverters 60 and 62 which are each generally comprised of inverting operational amplifiers along with feedback networks. The inversion is generally used since the summing circuit 58 oftentimes inverts the output signal.

The inverted sine-A signal is then introduced into a pair of switching circuits 64 and 66 and the cosine-A inverted signal is also introduced into a pair of amplifier-switching circuits 68 and 70. Each switching circuit comprises an operational amplifier 72 having resistors 74 in the inputs thereof, a resistive feedback 76 extends across each amplifier and a grounded switch 78 is connected to one of the inputs of each amplifier.

These switching circuits 64–70 are not necessarily required in the present invention, although they enable the use of lower cost digital/multiplying, digital-analog converters, as hereinafter described. The digital-analog converters are essentially four quadrant devices and operate in both polarities, that is, with both the positive and negative polarities of the signal. In other words, one-half of a wave form is substantially identical to the opposite polarity half of the wave form. These multipliers can effectively generate a two's complement, in this way, and it is therefore possible to operate with a relatively inexpensive multiplier-converter.

The outputs of the switching circuits 64 and 66 are introduced into individual digital-analog converters 82 and 84. In like manner, the outputs of the switching circuits 68 and 70 are introduced into individual multiplying digital-analog converters 86 and 88. The demand input signal B is introduced into a pair of read-only memories 90 and 92, the read-only memory 90 containing the conversions of the signal B into a cosine of the signal B. The read-only memory 92 contains that information to convert the signal B into the sine of the signal B. The SIN-B signal is introduced into the converters 84 and 86. The cosine signal, COS-B, is introduced into the converters 82 and 88, as shown. The output of the converters 82 and 86 are summed through summing resistors 94 and 96 and through a summing circuit 98 which is effectively the signal SIN (A+B). In like manner, the outputs of the convertors 84 and 88 are passed through summing resistors 100 and 102 and are introduced into a summing circuit 104. The output of this summing circuit 104 is the signal COS (A+B).

A pair of up-down counters 106 and 108 are used to generate the phase shift. These counters receive signals which may be equivalent of a forward and a backward demand signal. Thus, the forward signal represents the desired movement forward of the moveable member and the backward signal represents the desired movement rearwardly (or in an opposite direction) of the moveable member. These counters thereby effectively derive the demand signals B. When using an eight bit counter, one complete cycle of a sine wave is equivalent to 256 counts. In actual practice, a single counter can be used or otherwise the counters 106 and 108 must be synchronized.

In accordance with the above outlined circuitry, it can be observed that the circuit of the invention phase shifts the encoder signals and the system is operative even when the signal has a varying frequency which is unknown or essentially a zero frequency, as for example, in a true DC signal. The servo circuit always attempts to shift to a null condition. Thus, if the encoder signal is shifted 30 degrees, the servo circuit will attempt to drive the drive motor 10 with a signal for an additional 30 degrees. Considering, for example, a drum having a 3.6 inch diameter, and with a typical encoder disc, containing approximately 120 fringes, there is a possibility of obtaining incremental movements of 0.032 inch.

FIG. 4 illustrates the various wave forms generated in the circuit of the invention. FIG. 4a illustrates a sine/cosine square wave form as an output of one of the encoders. FIG. 4b shows the time frame sequence in which the signal can either be a sine or cosine signal. FIGS. 4c and 4d illustrate the timing with respect to the possibility of a sine wave form and a cosine wave form.

The signals representing the phase shift are introduced directly into the servo circuit which, in turn, controls the motor 10. In essence, the phase change which is accomplished by signals on lines 24 and 26 is a rotation of a vector constituting an addition of a phase angle to the signal from the servo circuit 28. The servo circuit 28 will normally always drive to a zero or null condtion. If, for example, an encoder was moved through a 30 degree arc, the servo circuit would attempt to drive 30 degrees back to a null condition. The system of the present invention increases the degree of accuracy achievable by using a conventional servo circuit, such as the circuit 28.

The movement of the drive member from a current or present position designated by "PP" to a demand or command position designated by "CP" in FIG. 5 is the arcuate movement represented by the vectors of the two positions. The arcuate difference between the current position PP and the demand position CP is effectively nulled by the servo circuit 28 through the arcuate null as shown in FIG. 5. In essence, the servo circuit 28 will drive the moveable member so that the vectors of the present position and command position are the same.

One of the unique aspects of the present invention is that it is possible to obtain information about a present position of a moveable member with a low cost encoder and convert this to a digital format for processing. A command position is also derived in a digital format for comparison and derivation of an error signal. This error signal is converted to an analog signal format for driving a servo circuit. In this way, it is possible to take advantage of low cost encoders. In the truly digital control circuit, it is inevitably necessary to use a very high cost encoder. When the two signals are generated by the phase shift circuit, they effectively represent the difference between the error signal which is used to drive to a null condition. These two signals, for example, may be combined in the adder 58 as shown in FIG. 2 or otherwise, a difference signal can be obtained.

With two signals which are phase shifted from a conventional low cost encoder, by a trigometric function of the signals and converting to an analog format, it is possible to obtain the error signal. This error signal is thereupon used to drive the moveable member via the servo circuit 28.

Thus there has been illustrated and described a unique and novel digital positioning servo operated control system which utilizes a pulse shift of encoder signals to increase servo position accuracy on a highly efficient basis. This apparatus therefore fulfills all of the objects and advantages sought therefore. It should be understood that many changes, modifications, variations and other uses and applications will become apparent to those skilled in the art after considering this specification and the accompanying drawings. Therefore, any and all such changes, modifications, variations and other uses and applications which do not depart from the nature and principals of the invention and which may become apparent to those skilled in the art after considering this specification and the accompanying drawings are deemed to be covered by the invention which is limited only by the following claims.

Having thus described my invention, what I desire to claim and secure by letters patent is:

1. In a closed loop digital control system having a moveable member adapted for movement to a command position in response to a command position signal, an encoding means for providing a first digital position information sine signal and a second digital position information cosine signal and a motive means for moving the moveable member, an improvement comprising:
   (a) a first digital-analog conversion-multiplying means for receiving the first digital position sine signal and converting same,
   (b) first memory means for providing a sine function of a demand signal,
   (c) first digital-analog coversion-multiplying means for receiving the first digital position signal and multiplying same in response to and by the sine function of the demand signal to provide a first phase shift signal component,
   (d) a second memory means providing a cosine function of the demand signal,
   (e) second digital-analog conversion-multiplying means for receiving the second digital position cosine signal and multiplying same in response to and by the cosine function of the demand signal to provide a second phase shift signal component, and
   (f) means to combine the two signal components to provide a phase shift signal.

2. The improvement in the control system of claim 1 further characterized in that the first position sine signal, SIN A, and the second position cosine signal, COS A, are multiplied by a demand signal B.

3. The improvement in the control system of claim 2 further characterized in that the first position signal, SIN A, is multiplied by the sine of the demand signal, Sin B, to provide a signal Sin A-Sin B and the first position signal, Sin A, is multiplied by the cosine of the demand signal, Cos B, to provide a signal Sin A-Cos B, and the second position signal, Cos A, is multiplied by the sine of the demand signal, Sin B, to provide a signal Cos A-Sin B, and the second position signal, Cos A, is multiplied by the cosine of the demand signal, Cos B, to provide a signal Cos A-Cos B, and the means to combine comprises a first summing means to combine the signal Sin A-Cos B and the signal Cos A-Sin B to provide a phase shift signal Sin (A+B) and a second summing means to combine the signal Sin A-Sin B and the signal Cos A-Cos B to provide a phase shift signal Cos (A+B).

4. The improvement in the control system of claim 3 further characterized in that the control system has a servo circuit and the phase shift signals are introduced into said servo circuit to modify a signal to the motive means.

5. The improvement in the control system of claim 4 further characterized in that the multiplying of the signals takes place in the digital to analog conversion means.

6. A method of substantially increasing position accuracy in a closed loop digital control system having a moveable member adapted for movement to a command position in response to a command position signal and a second digital position information signal, a motive means for moving a moveable member, the method comprising:
   (a) generating a first position signal which is a sine signal, SIN A,
   (b) generating a second position signal which is a cosine signal, Cos A,
   (c) multiplying the first position signal, Sin A, by the sine of a demand signal, Sin B, to provide a signal Sin A-Sin B,
   (d) multiplying the second position signal, Sin A, by the cosine of the demand signal, Cos B, to provide a signal Sin A-Cos B,
   (e) multiplying the second position signal, Cos A, by the sine of the demand signal, Sin B, to provide a signal, Cos A-Cos B,
   (f) multiplying the second position signal, Cos A, by the cosine of the demand signal, Cos B, to provide a signal Cos A-Cos B,
   (g) combining the signal Sin A—Cos B and the signal Cos A-Sin B to provide a phase shift signal Sin (A+B), and
   (h) combining the signal Sin A-Sin B and the signal Cos A-Cos B to provide a phase shift signal Cos (A+B).

7. The method of claim 6 further characterized in that said method comprises generating a sine of the demand signal B by a first memory which contains the sine of B and generating a cosine of the demand signal B by a second memory which contains the cosine of B.

8. A closed loop digital servo signal system comprising:
   (a) a drive means for driving a moveable member to a demand position,
   (b) encoder means for generating a pair of position signals responsive to a position of said drive means and one of said position signals being a sine signal (SIN A) and the other of the position signals being a cosine signal (COS A),
   (c) a phase shift means for phase shifting both of the position signals from the encoder means and which phase shifting comprises multiplying the SIN A signal and the COS A signal by position demand signal (B), and
   (d) a servo control circuit receiving the phase shifted signal for enabling the servo circuit to substantially increase the number of positions of the moveable member achieved by the servo circuit, said servo circuit having an output to the drive means.

9. The closed loop servo system of claim 8 further characterized in that an amplifier means is provided for amplifying the signal from the servo control circuit to the drive means.

10. The closed loop servo system of claim 8 further characterized in that said phase shift means comprises a pair of multipliers to receive the respective position signals, and a memory means to provide a trigonometric function of the demand signal and which position signals are multiplied by the trigonometric function of the demand signal in said multiplier.

11. The closed loop servo system of claim 8 further characterized in that said phase shift means comprises a pair of multipliers to receive the respective position signals, and a pair of separate memory means to provide trigonometric functions of the demand signal and which position signals are multiplied by the trigonometric functions of the demand signals in said multipliers.

12. The closed loop servo system of claim 8 further characterized in that the first position signal, sin A, is multiplied by the sine of the demand signal, sin B, to provide a signal sin A-sin B and the first position signal, sin A, is multiplied by the cosine of the demand signal, Cos B, to provide a signal sin A-cos B, and the second position signal, Cos A, is multiplied by the sin of the demand signal, sin B, to provide a signal Cos A-B and the second position signal, Cos A, is multiplied by the cosine of the demand signal, Cos B, to provide a signal Cos A-Cos B, and the means to combine comprises a first summing means to combine the signal Sin A-Cos B and the signal Cos A-Sin B to provide a phase shift signal Sin (A+B) and a second summing means to combine the signal Sin A-Sin B and the signal Cos A-Cos B to provide a phase shift signal Cos (A+B).

13. A closed loop digital control system for moving a moveable member to a command position in response to a command signal, said control system comprising:
 (a) encoding means for providing a first digital position information sine signal and a second digital position information cosine signal which are phase related and together represent a present position of a moveable member,
 (b) means for multiplying signals representing a command position for the moveable member by sine and cosine functions of those signals representing a command position,
 (c) digital to analog converting means for converting processed position information signals and multiplied command position signals to analog format,
 (d) means for comparing the present sine and cosine position signals and the command position signals in such manner as to drive a position error signal representing a difference between a present position of the moveable member and the command position therefor, and
 (e) motive means for moving a moveable member to the command position.

14. The control system of claim 13 further characterized in that said means for multiplying comprises:
 (a) first memory means providing a sine function of a command signal, and
 (b) a second memory means providing a cosine function of the command signal.

15. The control system of claim 14 further characterized in that said converting means comprises:
 (a) first digital-analog conversion means for receiving the first digital position signal and the multiplied command signal modified by the sine function of the command signal to convert to an analog format and provide a first phase shift signal component, and
 (b) second digital-analog conversion means for receiving the second digital position signal and the multiplied command signal modified by the cosine function of a command signal to convert to an analog format and provide a second phase shift signal component.

16. A method for substantially increasing position accuracy in a closed loop digital control system having a moveable member adapted for movement to a command position in response to a command position signal and which utilizes a first digital position information sine signal and a second digital position information cosine signal, said method comprising:
 (a) generating and providing a first digital position information sine signal and a second digital position information cosine signal which are phase related and together represent a present position of a moveable member,
 (b) multiplying signals representing a command position for the moveable position for the moveable member by sine and cosine functions of those signals representing a command position,
 (c) converting the processed position information signals and multiplied command position signals to an analog format,
 (d) comparing the present position sine and cosine signals and the command position signals in such manner to derive a position error signal representing a difference between a present position of the moveable member and the command position therefor, and
 (e) moving the moveable member to the command position.

17. In a closed loop digital control system having a moveable member adapted for movement to a command position in response to a command position signal, an encoding means for providing a first digital position trigonometric function information signal and a second digital position trigonometric function information signal and a motive means for moving the moveable member, an improvement comprising:
 (a) a first digital-analog conversion means for receiving the first digital position signal and converting same,
 (b) first memory means providing a first trigonometric function of a demand signal and which is the same trigonometric function as the information signals,
 (c) first digital-analog conversion means for receiving the first digital position signal and modifying same in response to the first trigonometric function of the demand signal to provide a first phase shift signal component,
 (d) a second memory means providing a second trigonometricfunction of the demand signal and which is the same trigonometric function as the information signals,
 (e) second digital-analog conversion means for receiving the second digital position signal and modifying same in response to the second trigonometric function of the demand signal to provide a second phase shift signal component, and
 (f) means to combine the two signal components to provide a phase shift signal.

18. The improvement in the control system of claim 17 further characterized in that the control system has a servo circuit and the phase shift signals are introduced into said servo circuit to modify a signal to the motive means.

19. The improvement in the control system of claim 18 further characterized in that the multiplying of the signals takes place in the digital to analog conversion means.

* * * * *